(12) United States Patent
Chen et al.

(10) Patent No.: US 7,252,351 B2
(45) Date of Patent: Aug. 7, 2007

(54) COMPUTER ENCLOSURE WITH FASTENING DEVICE

(75) Inventors: Hsuan-Tsung Chen, Tu-cheng (TW); Pin-Shian Wu, Tu-cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 409 days.

(21) Appl. No.: 10/952,684

(22) Filed: Sep. 29, 2004

(65) Prior Publication Data

US 2005/0140254 A1    Jun. 30, 2005

(30) Foreign Application Priority Data

Dec. 26, 2003  (TW) .............................. 92222769 U (51) Int. Cl.
*A47B 97/00*       (2006.01)
(52) U.S. Cl. .................................................. 312/223.2
(58) Field of Classification Search ............. 312/223.1, 312/223.2, 257.1; 361/683, 724; 16/412, 16/415; 292/126, 137, 159, 161, 163, 165, 292/173, DIG. 31
See application file for complete search history.

(56) References Cited

U.S. PATENT DOCUMENTS 3,743,336 A * 7/1973 Andrews ..................... 292/173
6,109,669 A * 8/2000 Pinkow ....................... 292/175
6,398,325 B1 * 6/2002 Chen et al. ............... 312/223.2
6,626,472 B1 * 9/2003 Berg ......................... 292/336.3
6,698,853 B2 * 3/2004 Chen et al. ................. 312/263
6,721,183 B1 * 4/2004 Chen et al. ................. 361/726
6,929,338 B2 * 8/2005 Chang ..................... 312/223.2
6,935,661 B1 * 8/2005 Farnsworth et al. ........ 292/162
2002/0163205 A1* 11/2002 Sekulovic ................... 292/163

FOREIGN PATENT DOCUMENTS

TW         386613       4/2000
TW       091219116    * 12/2002

* cited by examiner

*Primary Examiner*—James O. Hansen
(74) *Attorney, Agent, or Firm*—Morris Manning & Martin LLP; Tim Tingkang Xia, Esq.

(57) ABSTRACT

A computer enclosure includes a cage (10) with a rear panel (14), a side panel (20) with a flange (122a) and a fastening device (30). The fastening device includes a holder (40) attached to the side panel, an slider (50), an operator (60) with protruding bars (66), and a spring (70) disposed between the slider and the holder. The holder includes a base (41) rotatably receiving the operator and pairs of hooks (447) for movably holding the slider. The slider includes a pair of cutouts (522) and a fastening portion (55). The operator is rotated and the protruding bars engage with the cutouts to move the slider forwardly and compress the spring. The side panel is attached to the cage with the flange abutting against the rear panel. The protruding bars move the slider backward and the fastening portion abut against inner surfaces of the flange, with the operator released.

21 Claims, 8 Drawing Sheets

COMPUTER ENCLOSURE WITH FASTENING DEVICE

BACKGROUND OF THE INVENTION

1. Field of the Invention

The present invention relates to a computer enclosure, and in particular to a computer enclosure having a fastening device for readily securing a side panel to the computer enclosure and detaching the side panel therefrom.

2. Related Art

Many different means are used to secure side panels to computer enclosures. One conventional means is to simply screw a side panel directly to a computer enclosure. However, this operation requires a screwdriver. Installation and removal of the side panel is unduly cumbersome and time-consuming.

As computers have proliferated and improved, various fastening means have been developed to facilitate installation and removal of side panels. One means of fastening is shown in Taiwan Patent Publication No. 386613. Locking means of the patent comprises a plurality of hooks inwardly formed from a flange of one side of a side panel of a computer casing, for engaging in corresponding slots defined in a rear panel of the computer casing. An opposite side of the side panel forms an L-shaped flange. A plurality of apertures is defined in the L-shaped flange, for fixing of screws thereon. Because screws are needed to fix the side panel to the computer casing, installation and removal of the side panel is still unduly cumbersome and time-consuming.

An improved fastening device for securing a side panel to a computer enclosure which overcomes the above-mentioned problems is desired.

SUMMARY OF THE INVENTION

Accordingly, an object of the present invention is to provide a computer enclosure having a fastening device for readily securing a side panel to the computer enclosure and readily detaching the side panel therefrom.

To achieve the above-mentioned object, a computer enclosure includes a cage with a rear panel, a side panel with a flange and a fastening device. The fastening device includes a holder attached to the side panel, a slider, an operator with protruding bars, and a spring disposed between the slider and the holder. The holder includes a base rotatably receiving the operator and pairs of hooks for movably holding the slider. The slider includes a pair of cutouts and a fastening portion. The operator is pulled to rotate and cause the protruding bars of the operator to engage with the cutouts and move the slider to compress the spring. The side panel is attached to the cage and the flange abuts against the rear panel. The protruding bars move the slider backward and the fastening portion abuts against inner surfaces of the flange when the operator is released.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
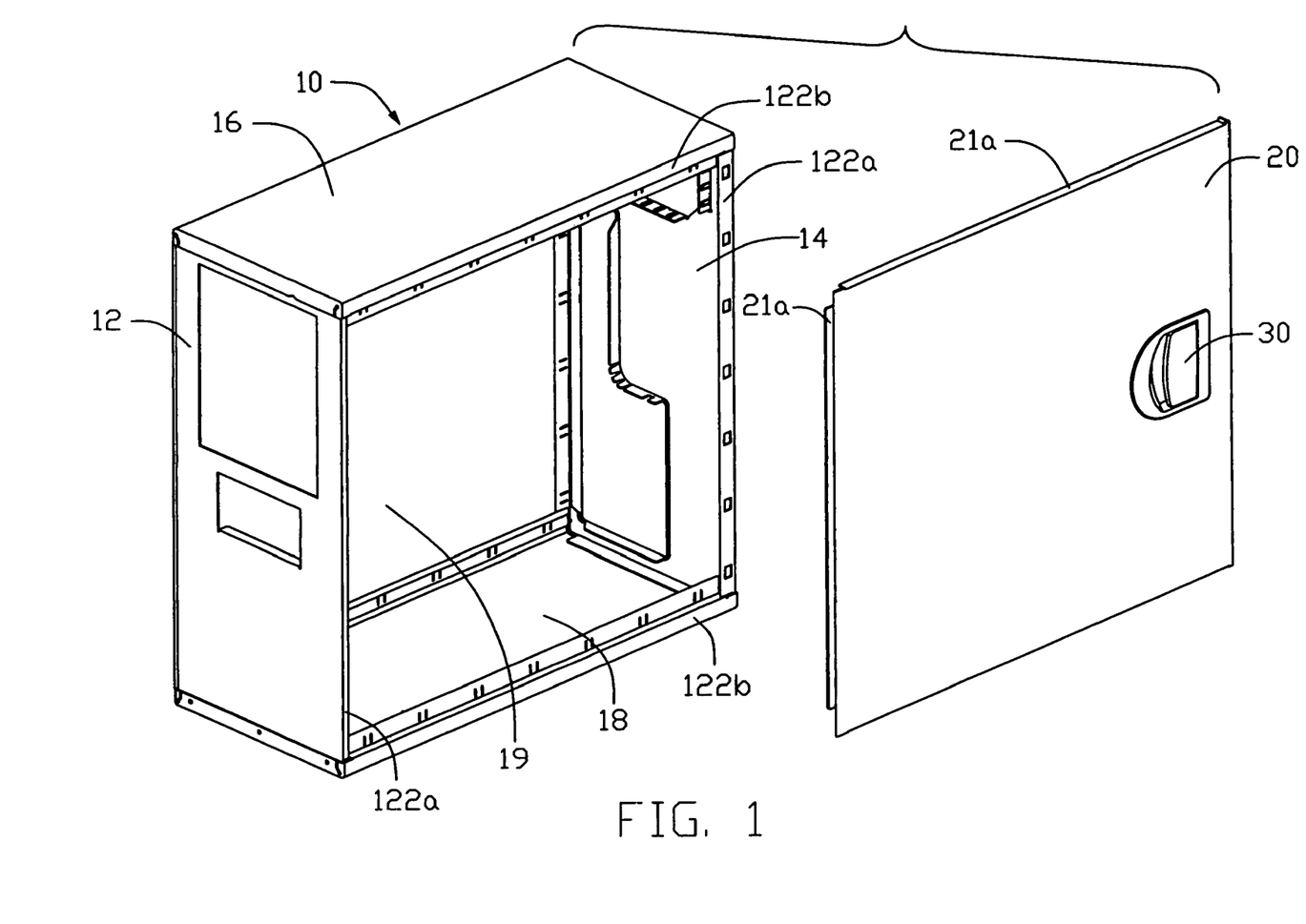
FIG. 1 is an exploded, isometric view of a fastening device of the present invention, together with a cage and a side panel.
Figure 2:
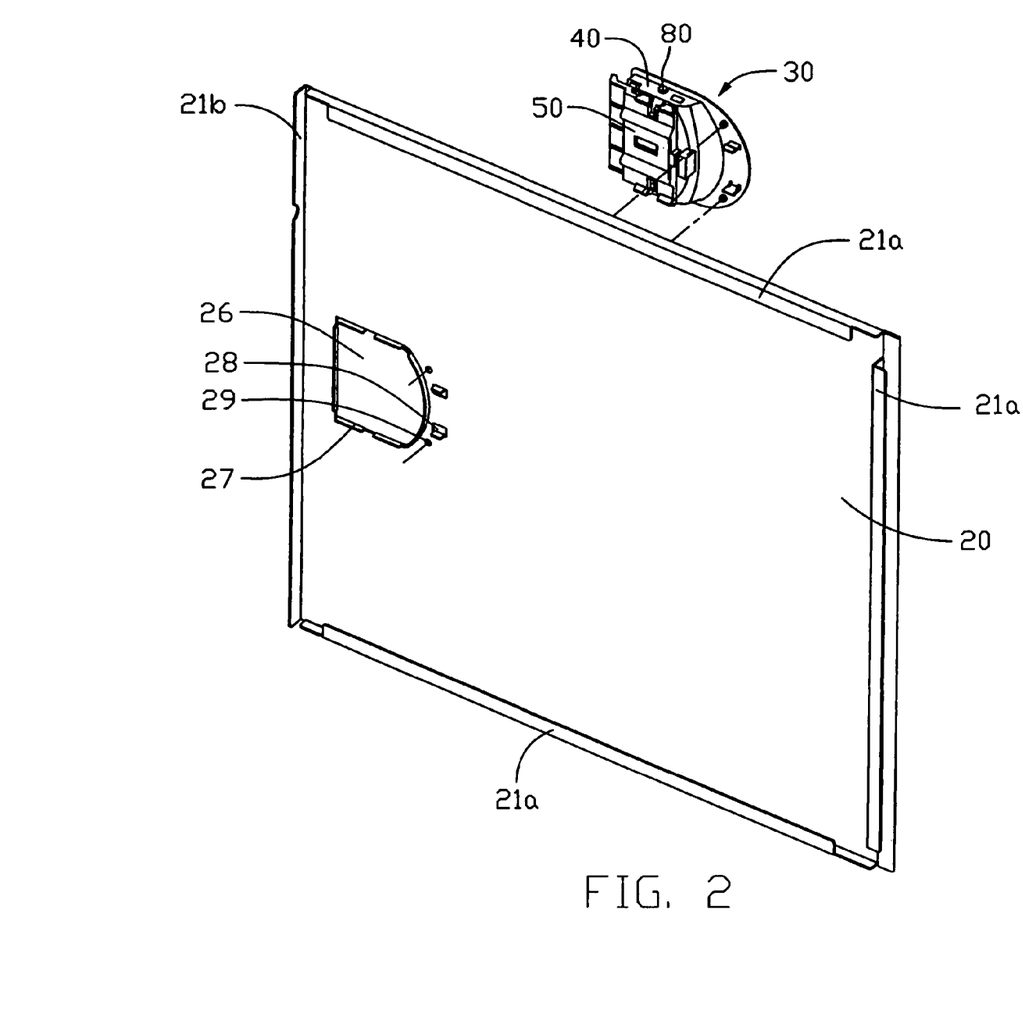
FIG. 2 is an exploded, isometric view of the side panel and the fastening device of FIG. 1, but viewed from another aspect.

Referring to FIGS. 1 and 2, a computer enclosure of the present invention comprises a cage 10, a side panel 20, and a fastening device 30. The side panel 20 is attached to the cage 10 via the fastening device 30. The fastening device 30 comprises a holder 40, a slider 50, and an operator 60.

The cage 10 comprises a front panel 12, a rear panel 14, a top panel 16, and a bottom panel 18, all of which cooperatively define an opening 19 therebetween. A pair of flanges 122a extends toward each other from the front panel 12 and the rear panel 14, respectively. Another pair of flanges 122b extends toward each other from the top panel 16 and the bottom panel 18, respectively.

The side panel 20 comprises a plurality of flanges 21a and a vertical flange 21b extending from edges thereof. Each flanges 21a has an L-shaped profile. An opening 26 is defined in the side panel 20 adjacent a left flange 21a. A plurality of rims 27 extends perpendicularly from an inner side of the side panel 20 around the opening 26. A pair of apertures 29 is defined in the side panel 20. The apertures 29 are near the opening 26 and far away the flange 21b. A pair of tabs 28 extends perpendicularly from an inner face of the side panel 20 between the apertures 29.

Figure 3:
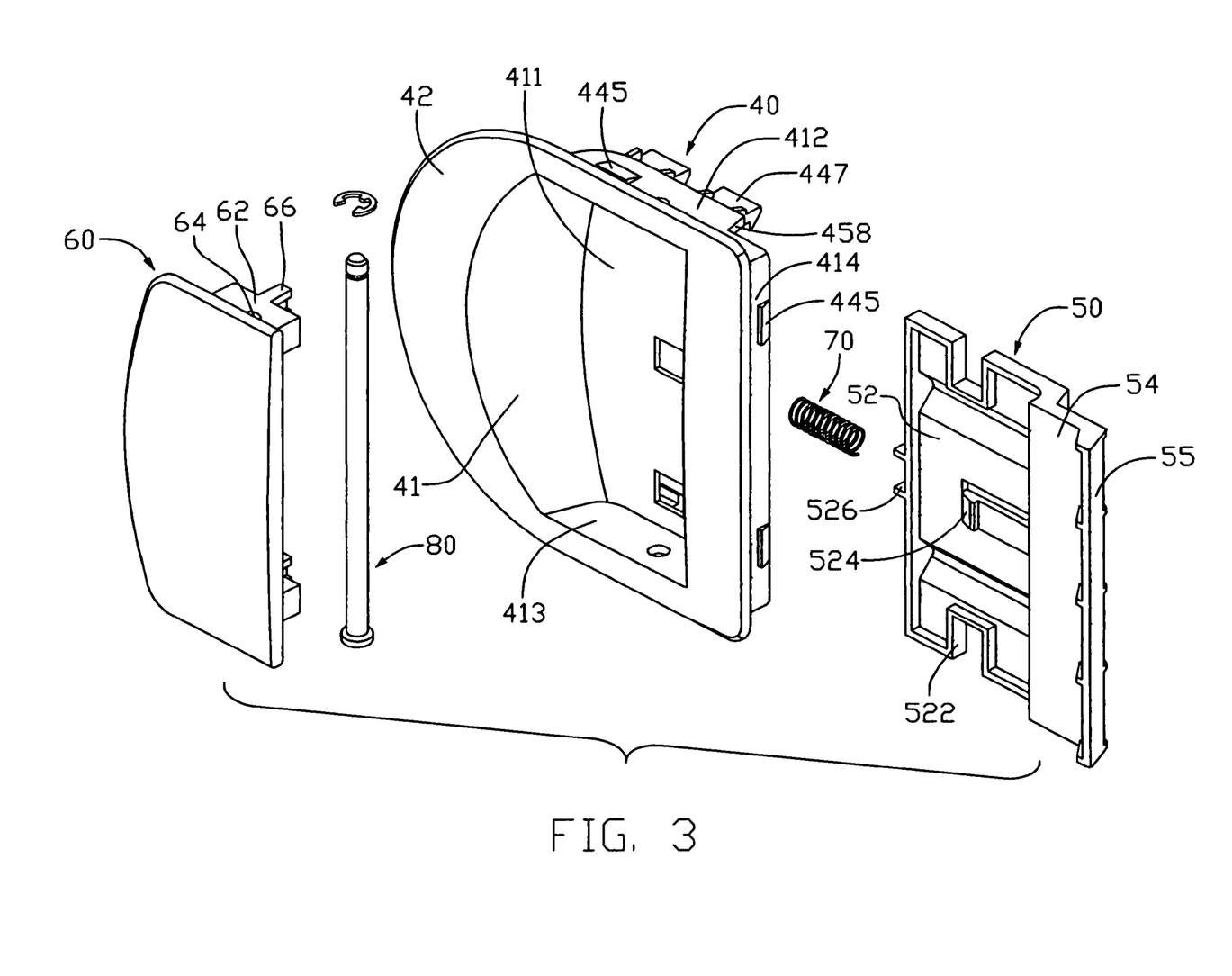
FIG. 3 is an exploded, enlarged view of the fastening device of FIG. 1.
Figure 4:
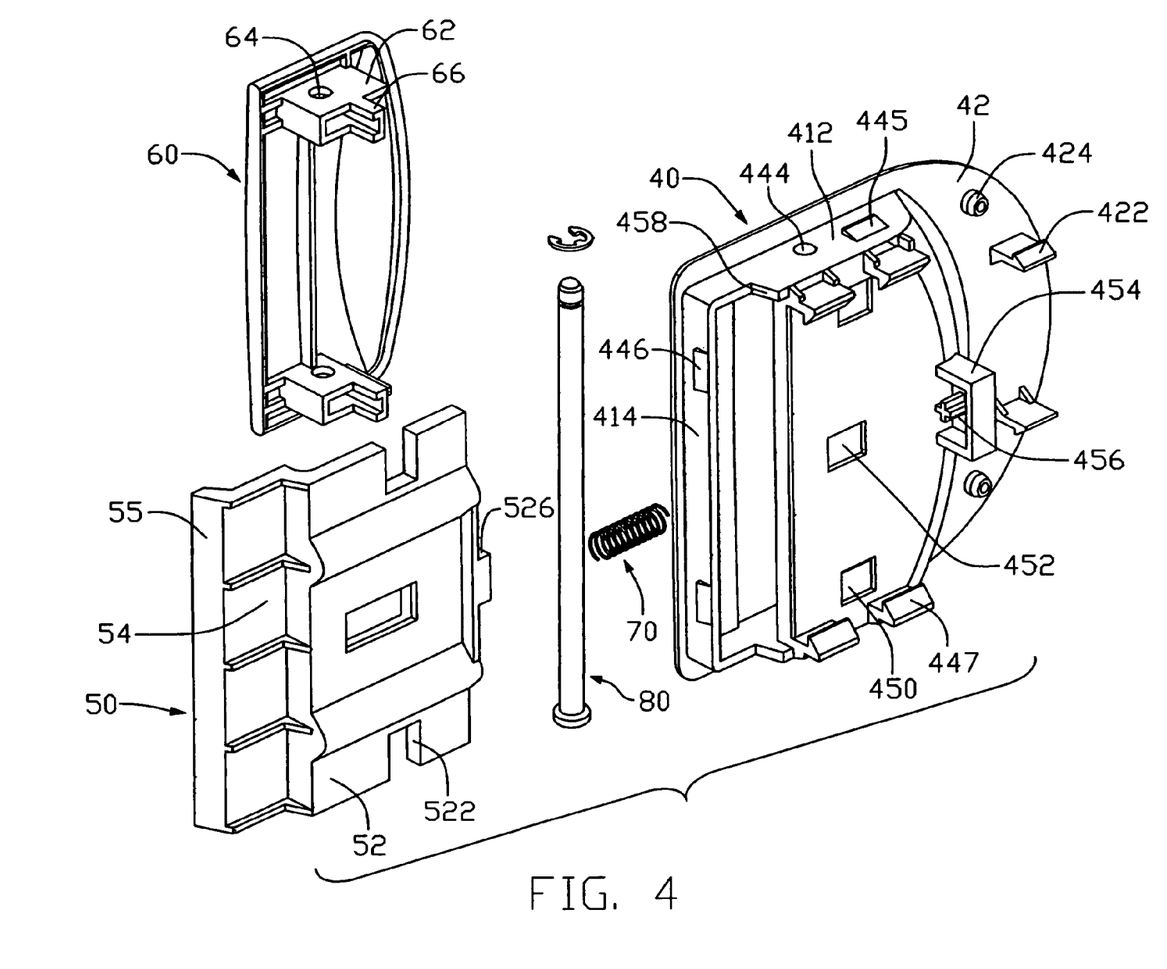
FIG. 4 is similar to FIG. 3, but viewed from another aspect.
Figure 5:
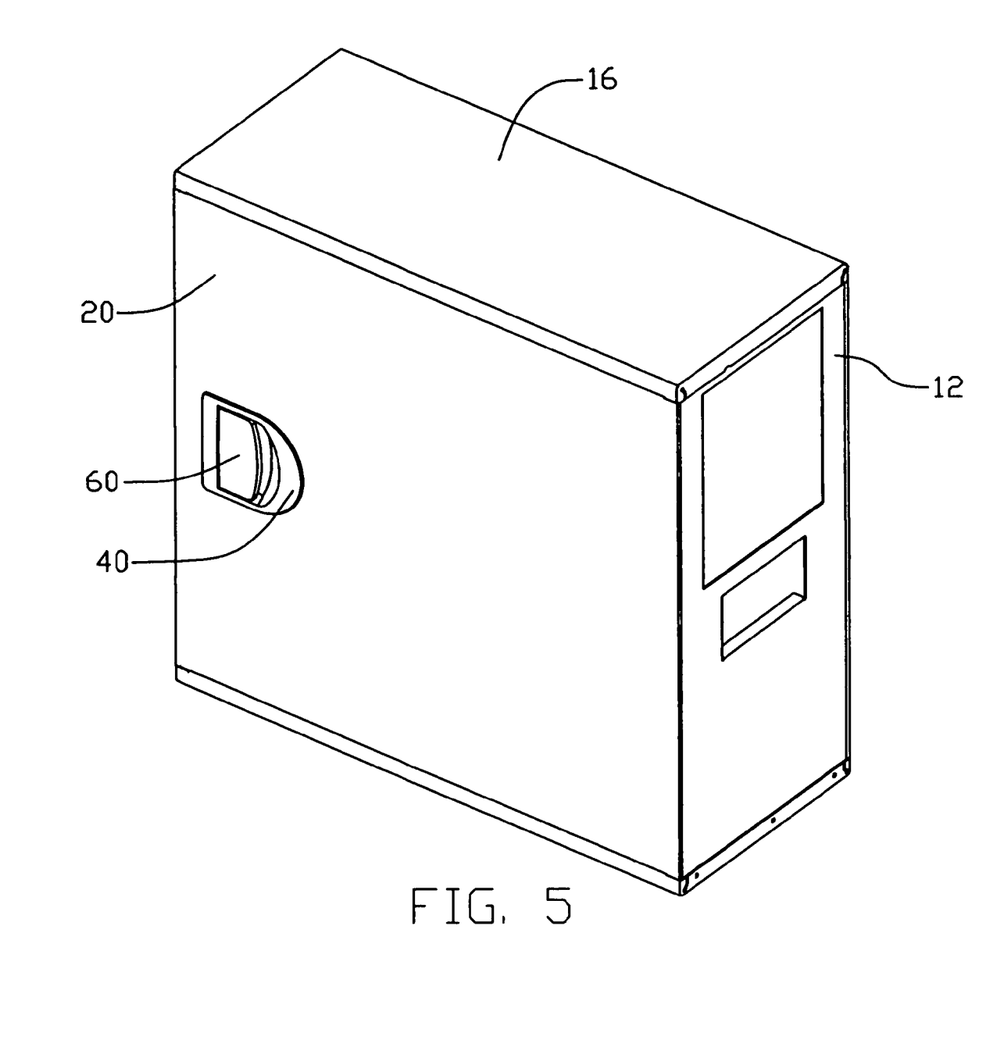
FIG. 5 is an assembled view of FIG. 1, showing the fastening device in a locked state.

Referring also to FIGS. 3 and 4, the holder 40 generally has a basin-shaped configuration and is received in the opening 26 of the side panel 20. The holder 40 comprises a main body 41 and a brim 42 formed at end edges of the main body 41. The main body 41 comprises a base 411, a top wall 412, a bottom wall 413, and an end wall 414. A pair of catches 422 and posts 424 extend from an inner face of the brim 42, for respectively engaging with the tabs 28 and apertures 29 of the side panel 20. A plurality of wedges 446 extends outwardly from an outer surface of the top wall 412, the bottom wall 413, and the end wall 414, for engaging with the rims 27 of the side panel 20. A pair of hooks 447 extends outwardly from an upper portion and a lower portion of the base 411 respectively, cooperatively defining a guiding space between the hooks 447 for the slider 30 moving therein. A pair of first slots 450 is defined in the base 411 between the hooks 447. A second slot 452 is defined in the base 411 between the first slots 450. A first bracket 454 extrudes outwardly from the base 411 adjacent to the brim 42. A post 456 is parallel to the base 411 disposed in the bracket 454 for holding a resilient member therearound, e.g. a spiral spring 70. Parts of left portions of the main body 41 are cut away and a generally L-shaped shoulder 458 is formed. A pair of first through holes 444 is separately defined in the top wall 412 and the bottom wall 413.

The slider 50 is attached to the holder 40 and moves in the guiding space defined between the hooks 447. The slider 50 comprises a sliding portion 52, a connecting portion 54, and a fastening portion 55 extending from an outmost portion of the connecting portion 54. The connecting portion 54 is generally L-shaped configuration, corresponding to the shoulder 458 of the holder 40. A pair of cutouts 522 is defined in a top portion and a bottom portion of the sliding portion 52, corresponding to the first slots 450 of the holder 40. A resilient latch 524 extends transversally and outwardly from a middle of the sliding portion 52, for slidably received in the second slot 452 of the holder 40. A second bracket 526 extends outwardly from an outmost portion of the sliding portion 52, corresponding to the first bracket 454 of the holder 40 to hold the spring 70 therebetween.

The operator 60 is pivotally located in the main body 41 of the holder and has a symmetrical structure. A pair of parallel hollow blocks 62 extends inwardly from a top portion and a bottom portion of the operator 60. A pair of second through holes 64 is defined in each of the blocks 62, corresponding to the first through holes 444 of the holder 40 to pivotally receive a shaft 80 therein. A protruding bar 66 is formed perpendicularly to each block 62, corresponding to the cutouts 522 of the slider 50 and the first slots 450 of the holder 40.

Figure 6:
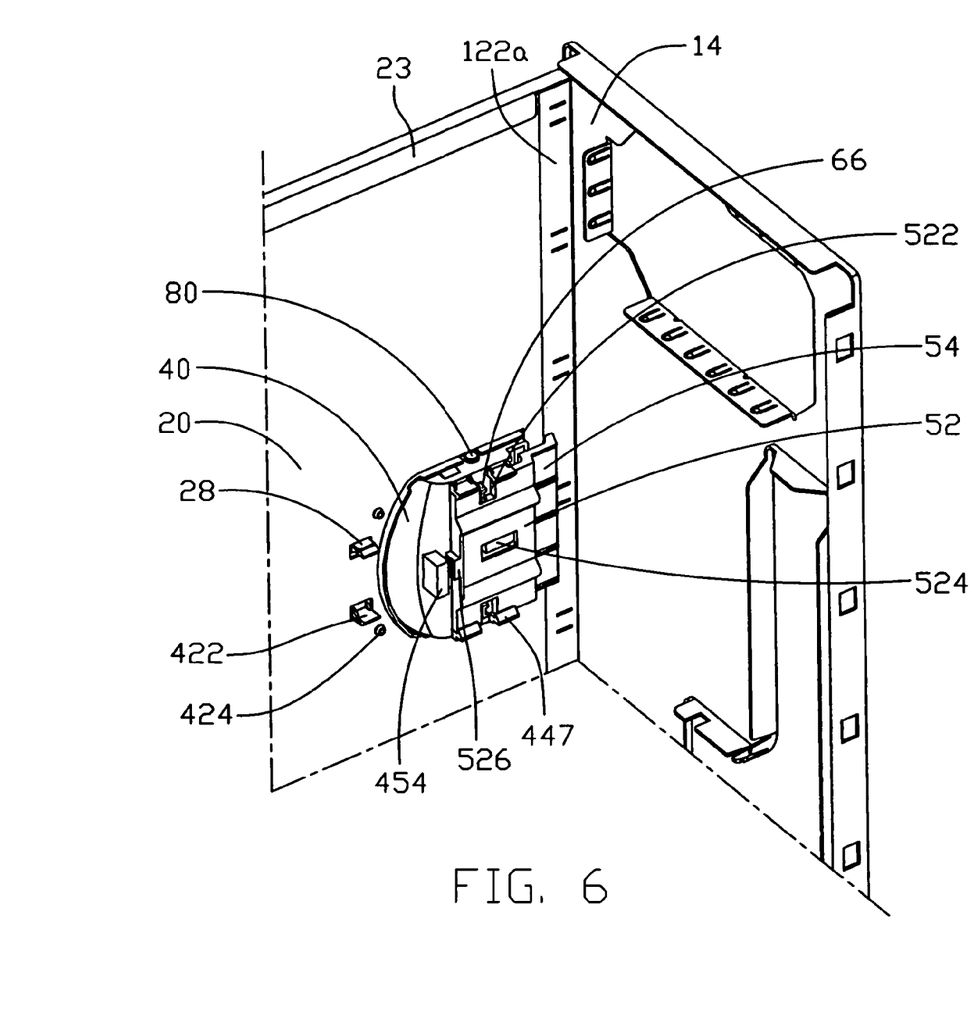
FIG. 6 is similar to FIG. 5, but viewed from another aspect.

Referring also to FIG. 6, in assembling the fastening device 30, the slider 50 is movably attached to the holder 40. The spring 70 is disposed around the post 456 and held between the first bracket 454 and the second bracket 526. The sliding portion 52 of the slider 50 is received in the guiding space defined between the hooks 447, with the latch 524 extending into the second slot 452. The second slot 452 aligns with the cutout 522. The slider 50 slides on base 411 of the holder 40, and the connecting portion 52 moves corresponding to the shoulder 458. Then the operator 60 is pivotally attached to the holder 40 via the shaft 80. The protruding bars 66 are extended into the cutouts 522 of the slider 50 and the first slots 450 of the holder 50.

Figure 7:
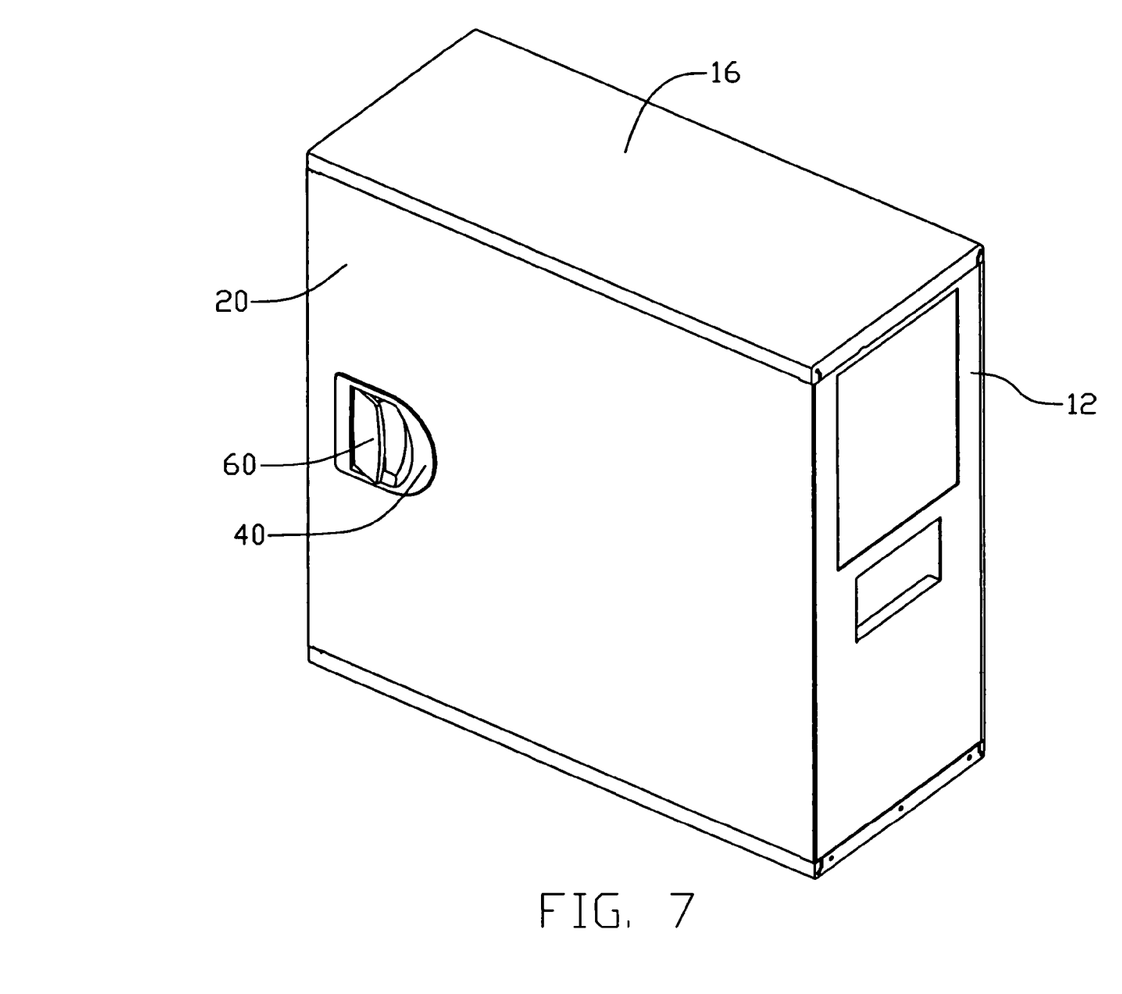
FIG. 7 is an assembled view of FIG. 1, but showing the fastening device in an unlocked state 1.
Figure 8:
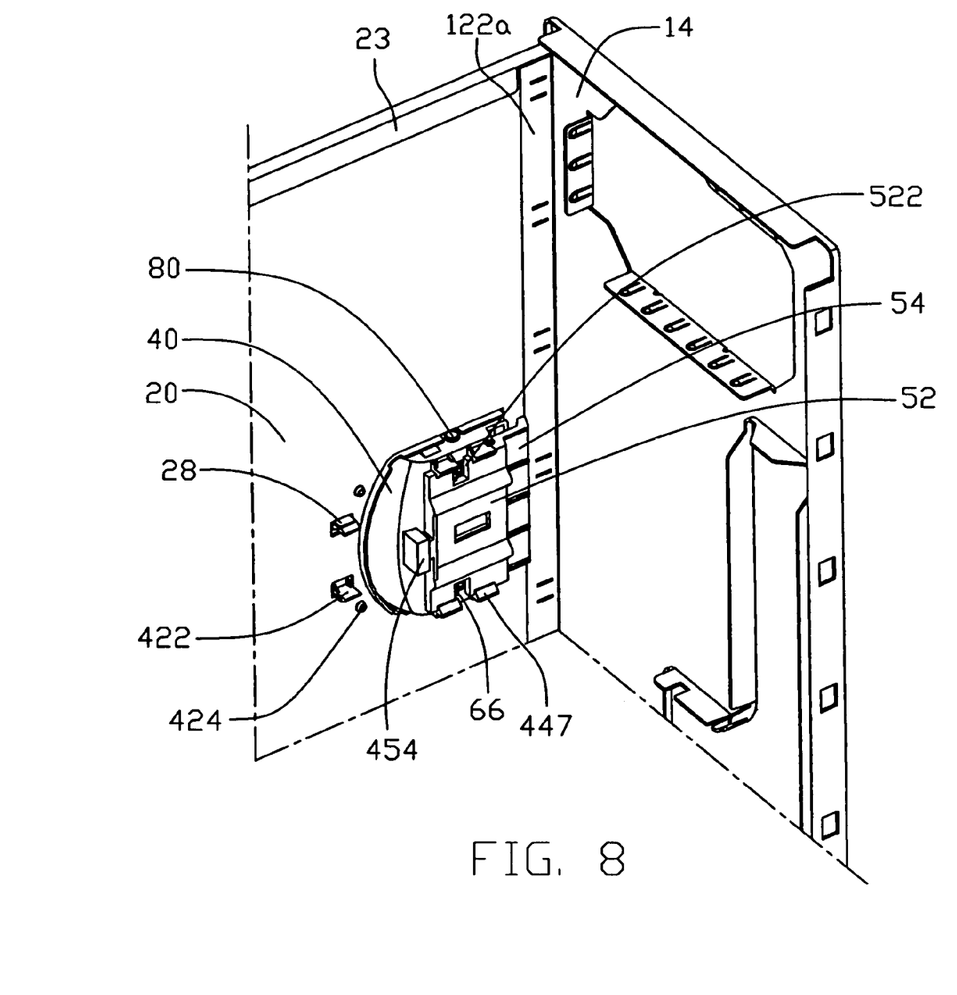
FIG. 8 is similar to FIG. 7, but viewed from another aspect.

Referring also to FIG. 7, the fastening device 30 is attached to the side panel 20. The main body 41 of the holder 40 is received in the opening 26 of the side panel 20, with the wedges 445 engaging with the rims 27, the catches 422 engaging with the tabs 28, and the posts 424 engaging in the apertures 29.

Then the assembled side panel 20 and the fastening device 30 is attached to the cage 10. In the unlocked state of the side panel 20, the operator 60 is pulled to rotate about the shaft 80 so that the protruding bars 66 engage with the cutouts 522 of the slider 50 to move the slider 50 toward the first bracket 456 and the spring 70 is compressed. The side panel 20 is attached to the cage 10 for covering the opening 19. The flanges 21a of the side panel 20 abut the flanges 122a of the cage 10 and the flange 21b abuts against outer surfaces of the rear panel 14. In the locked state of the side panel 20, the operator 60 is released and reversely rotates to original position. The spring 70 decompresses and drives the slider 50 backwardly away from the first bracket 454. The fastening portion 55 of the slider 50 tightly abuts against an inner surface of the flange 122a of the rear panel 14 so as to exert an urging force thereon. Thus the side panel 20 is secured on the cage 10.

Detachment of the side panel 20 is essentially the reverse process of the above-described attachment procedure. The operator 60 is pulled to rotate about the shaft 80 so that the protruding bars 66 can engage the cutout 522 to drive the slider 50 forwardly to the first bracket 454. The fastening portion 55 is moved away the flange 122a of the rear panel 14 of the cage 10. Then the side panel 20 is easily detached from the cage 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A computer enclosure comprising:
   a cage comprising a rear panel, a first flange extending from the rear panel;
   a side panel attached to the cage and comprising a second flange; and
   a fastening device attached to the side panel and comprising a holder, a slider movably attached to the holder, an operator rotatably attached to the holder, and a spring disposed between the holder and the slider, the holder comprising pairs of hooks movably holding the slider, the slider comprising a pair of cutouts and a fastening portion, and the operator comprising a pair of protruding bars;
   wherein the operator is rotated so that the protruding bars engage in the pair of cutouts to drive the slider forward wherein the spring is compressed and the fastening portion disengages from an inner surface of the first flange whereby the side panel is removed from the cage; and
   wherein the operator is released so that the spring rebounds and the slider is driven backward wherein the fastening portion engages the first flange together with the second flange abutting the rear panel whereby the side panel is secured to the cage.

2. The computer enclosure as described in claim 1, wherein the holder has a basin-shaped configuration and comprises a main body, and a brim, the main body comprises a base, a top wall, a bottom wall, and an end wall.

3. The computer enclosure as described in claim 2, wherein the main body comprises a plurality of wedges extending from outer surfaces of the top wall, the bottom wall, and the end wall, the brim comprises a plurality of posts and catches formed from an inner surface thereof.

4. The computer enclosure as described in claim 3, wherein the side panel comprises an opening for receiving the main body, and a plurality of rims formed from edges of the opening, for engaging with the wedges of the holder.

5. The computer enclosure as described in claim 3, wherein the side panel comprises a plurality of apertures and tabs disposed around the opening, for engaging with the post and the catches of the holder.

6. The computer enclosure as described in claim 2, wherein the holder defines a pair of first through holes in the top and bottom walls and a plurality of slots in the base.

7. The computer enclosure as described in claim 6, wherein a first bracket is disposed from the base adjacent to the brim and comprises a post disposed therein.

8. The computer enclosure as described in claim 7, wherein the slider further comprises a sliding portion with the pair of cutouts defined therein.

9. The computer enclosure as described in claim 8, wherein a second bracket is formed at outmost of the sliding portion, corresponding to the first bracket for holding a spring therebetween.

10. The computer enclosure as described in claim 8, wherein a resilient latch is formed in the sliding portion, for engaging in one of the slots of the holder.

11. The computer enclosure as described in claim 6, wherein the operator comprises a pair of blocks, a pair of second through holes is respectively defined in the blocks, corresponding to the first though holes of the holder for rotatably receiving a shaft therein, the protruding bars are formed in the fronts of the blocks.

12. A fastening device adapted to be attached to a side panel for securing the side panel to a computer cage, comprising:
- a holder adapted to be attached to the side panel, the holder comprising a main body, the main body comprising a base;
- a slider movably attached to the holder, the slider comprising a fastening portion and at least one cutout; and
- an operator rotatably disposed in the main body of the holder, the operator comprising at least one protruding bar; and
- a resilient member disposed between the holder and the slider;
- wherein when the operator is rotated outwardly, the resilient member is compressed, the protruding bar engages said at least one cutout to drive the slider move in a first direction such that the fastening portion disengages from the cage; and
- when the operator is released, the resilient member rebounds and decompresses to drive the slider in a second direction opposite to the first direction, the fastening portion engages with the cage, wherein the main body further comprising a top wall, and a bottom wall, a pair of first through holes defined in the top and bottom wall, a plurality of slots defined in the base, the operator comprising a pair of frames, a pair of second through holes defined in each of the frames, and a shaft rotatably received in the first and second through holes.

13. The computer enclosure as described in claim 12, wherein the slider comprises a sliding portion, a latch is formed in the sliding portion, a slot is correspondingly defined in the base.

14. The computer enclosure as described in claim 12, wherein a first bracket is disposed at the base of the holder, a second bracket is correspondingly formed on the slider, for cooperatively holding the resilient member.

15. A computer enclosure comprising:
- a first panel having a first flange extending perpendicularly therefrom;
- a second panel abutting against the first flange of the first panel; and
- a fastening device arranged at the second panel, the fastening device comprising a holder, a slider movably attached to an inner side of the holder, and an operator pivotably attached to an outer side of the holder, a resilient member connected between the slider and the holder, the slider having a pressing end to grasp the first flange of the first panel in the force of the resilient member;
- wherein the operator is rotated to drive the slider away from the first panel, so that the pressing end of the slider releases the first flange of the first panel and the resilient member is compressed, the second panel is thereby taken away from the first panel, the slider defining a cutout therein, a protrusion bar being formed on the operator and extending through the holder to be accommodated in the cutout.

16. The computer enclosure as recited in claim 15, wherein the second panel comprising a second flange extending perpendicularly therefrom, and abutting against an outside of the first panel.

17. The computer enclosure as recited in claim 15, wherein through holes are defined in the holder and the operator, a shaft extends through the through holes to rotatably connect the operator to the holder.

18. A fastening device for securing a detachable panel to a cage so as to form a computer enclosure, comprising:
- a holder formed at said detachable panel and comprising a basin-shaped main body, the main body comprising a base, a top wall, a bottom wall, and an end wall, the top wall, the bottom wall and the end wall extending from edges of the base together with the base cooperatively defining a receiving space;
- a slider movably attached to said holder located outside of the receiving space and confined by said holder to be resiliently movable along a predetermined direction between a first position to reach said cage for being secured thereon and a second position for releasing therefrom, said slider comprising at least one cutout defined therein; and
- an operator movably attached to said holder located in the receiving space and comprising at least one protruding bar extending through the base of the holder to engage with said at least one cutout to move said slider from said first position to said second position.

19. The computer enclosure as recited in claim 18, wherein the holder comprises pairs of hooks movably holding the slider.

20. The computer enclosure as recited in claim 18, wherein the detachable panel comprises a first flange extending therefrom, the cage comprises a second flange, the operator is rotated to drive the slider away from the first panel, so that the slider releases the first flange of the detachable panel to take the second panel away from the first panel.

21. The computer enclosure as recited in claim 20, wherein a resilient member is disposed between the holder and the slider, the slider comprises a pressing end to grasp the first flange of the detachably panel in the force of the resilient member.

* * * * *